(12) United States Patent
Ludden et al.

(10) Patent No.: US 10,936,505 B2
(45) Date of Patent: Mar. 2, 2021

(54) METHODS AND SYSTEMS FOR VERIFYING OUT-OF-ORDER PAGE FAULT DETECTION

(71) Applicant: International Business Machines Corporation, Armonk, NY (US)

(72) Inventors: John M. Ludden, Essex Junction, VT (US); David Campbell, Austin, TX (US); Lance Hehenberger, Cedar Park, TX (US); Madhusudan Kadiyala, Bangalore (IN); George W. Rohrbaugh, III, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/227,381

(22) Filed: Dec. 20, 2018

(65) Prior Publication Data

US 2020/0201778 A1   Jun. 25, 2020

(51) Int. Cl.
| | |
|---|---|
| *G06F 12/1009* | (2016.01) |
| *G06F 12/0891* | (2016.01) |
| *G06F 9/30* | (2018.01) |
| *G06F 12/0862* | (2016.01) |
| *G06F 9/38* | (2018.01) |
| *G06F 9/345* | (2018.01) |
| *G06F 9/48* | (2006.01) |

(52) U.S. Cl.
CPC ...... *G06F 12/1009* (2013.01); *G06F 9/30043* (2013.01); *G06F 9/345* (2013.01); *G06F 9/3836* (2013.01); *G06F 9/4812* (2013.01); *G06F 12/0862* (2013.01); *G06F 12/0891* (2013.01)

(58) Field of Classification Search
CPC ............ G06F 12/1009; G06F 9/30043; G06F 9/3836; G06F 12/0891; G06F 9/345; G06F 9/4812; G06F 12/0862
See application file for complete search history.

(56) References Cited

U.S. PATENT DOCUMENTS

| | | | |
|---|---|---|---|
| 2011/0320749 A1 | 12/2011 | Gonion | |
| 2017/0160991 A1 | 6/2017 | Choi et al. | |
| 2017/0161209 A1* | 6/2017 | Bussa | G06F 12/0808 |
| 2019/0196982 A1* | 6/2019 | Rozas | G06F 21/53 |
| 2019/0236019 A1* | 8/2019 | McNeeney | G06F 12/0615 |

* cited by examiner

*Primary Examiner* — David Yi
*Assistant Examiner* — Zubair Ahmed
(74) *Attorney, Agent, or Firm* — Scully, Scott, Murphy & Presser, P.C.

(57) ABSTRACT

Verification of asynchronous page fault in a simulated environment. The methods include providing a simulated environment that includes a simulated processor core, a memory, and an interrupt handler. The methods also include executing a test code in the simulated environment by: executing a non-irritator thread code comprising a plurality of load instructions that span at least two slices of the simulated processor core, executing a first irritator thread code to bias against the execution of the plurality of load instruction by one of the at least two slices of the simulated processor core, and executing a second irritator thread code to invalidate caching of page table entries during execution of the plurality of load instructions in a fast access cache memory.

20 Claims, 6 Drawing Sheets

METHODS AND SYSTEMS FOR VERIFYING OUT-OF-ORDER PAGE FAULT DETECTION

BACKGROUND

The disclosure herein relates generally to computer hardware testing and development, and more particularly, to methods, apparatus, and products for verifying out-of-order page fault detection.

Modern multiprocessor computer systems provide a means for two or more processors to access and modify common memory locations. Such locations are said to be shared locations, and each location is said to contain a shared variable. Another context in which shared variables exist within a computer system is within a single processor in which separate and distinct programs (sometimes called processes) reside concurrently in the single processor. Each process takes control for a period of time called a quantum and at the end of the quantum, the process is suspended while another process is granted access to the processor. Execution of the processes are such that their respective time quanta are interlaced in time and granted on a round-robin or priority basis. The processes can access and modify common locations, and thus these processes in a single processor logically operate on shared memory locations as if they were executing on separate and distinct processors.

Hence, in a shared memory environment where data can be changed by each processor core and/or each process, it is necessary to ensure that a single processor does not use outdated data. The traditional methods for verifying interrupts caused by the execution of a specific instruction (synchronous exception) is to use an instruction level test case generator that utilizes an architecture level reference model to produce expected results in the test case. As each instruction is generated, the instruction is executed on the architecture level reference model, and if the instruction causes an exception, the test case results for that instruction predict that a synchronous interrupt should occur (e.g., a synchronous storage exception). An interrupt handler will typically cause execution to resume by returning normal test execution to another instruction and skipping the instruction which resulted in the exception without making attempts to remedy the cause of the exception. These predicted results in the test case can then be verified against the hardware design behavior observed during pre-silicon simulation of the design simulation environment run-time checking code on an instruction-by-instruction bases.

However, such traditional methods cannot be used for verifying asynchronous interrupts (e.g., asynchronous page faults) that are generated by a processor as a result of an external event and/or as an event that is not in sync with processor instruction execution. For example, an asynchronous page fault may occur if an operating system or hypervisor reclaims a page in memory during the execution of an instruction. However, since such asynchronous page faults are not predictable, simulation of an asynchronous page fault to verify detection and proper handling remains a challenge during pre-silicon verification.

In order to find hardware and/or software problems it is known to run "test cases" on a software model version of a processor (also called pre-silicon verification). Microprocessor Pre-Silicon functional verification is typically accomplished by supplying test templates into an automated test case generation tool which produces assembly level instruction sequences that are used as stimuli. Faulty behavior of the design is detected by driving the stimuli into a design simulator and comparing the actual behavior of the design with the expected behavior implied by the input stimuli. These templates are typically produced by engineers to exercise certain Architectural and Micro Architectural functions within the microprocessor.

SUMMARY

The summary of the disclosure is given to aid understanding of a computer system, computer architectural structure, processor, and method of verifying out of order page fault verification in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

According to an embodiment of the present disclosure, describes systems and methods for verification of asynchronous page fault in a simulated environment. The methods include providing a simulated environment that includes a simulated processor core, a memory, and an interrupt handler. The methods also include executing a test code in the simulated environment by: executing a non-irritator thread code comprising a plurality of load instructions that span at least two slices of the simulated processor core, executing a first irritator thread code to bias against the execution of the plurality of load instruction by one of the at least two slices of the simulated processor core, and executing a second irritator thread code to invalidate caching of page table entries during execution of the plurality of load instructions in a fast access cache memory.

In certain embodiments, the simulated processor core may include a non-irritator thread configured to execute the non-irritator thread code, a first irritator thread configured to execute the first irritator thread code, and a second irritator thread configured to execute the second irritator thread code. Additionally and/or alternatively, the memory may include one or more operands that are not aligned at a doubleword boundary. Optionally, execution of each instruction in the plurality of instructions of the non-irritator thread code may cause the at least two slices to perform a disjointed storage access to retrieve the one or more operands from the memory.

In at least one embodiment, executing the first irritator thread code to bias against the execution of the plurality of load instruction by one of the at least two slices of the simulated processor core may include causing that one slice to execute a first load operation in an infinite loop.

In some embodiments executing the non-irritator thread code may include, for each of the plurality of instructions identifying the at least two slices, issuing a PTE fetch request to the memory by a first slice of the at least two slices, turning OFF a valid bit of the PTE before returning the PTE to the first slice of the at least two slices, and returning the PTE to the first slice of the at least two slices. Optionally, the method may also include issuing a PTE fetch request to the memory by a second slice of the at least two slices, and returning the PTE to the first slice of the at least two slices, wherein the valid bit of the PTE is ON. Additionally and/or alternatively, the method may also include reporting a page fault interrupt to the page fault handler by the first one of the at least two slices, turning ON the valid bit of the PTE by the page fault handler, and returning execution to the instruction being executed by the page fault handler. Optionally, an asynchronous page fault may be detected if a page fault interrupt was reported by the first slice of the at least two slices and not by the second slice of the at least two slices. However, an asynchronous page fault is not detected if a page fault interrupt was reported by none of the at least two slices and/or the page fault interrupt was reported by all of the at least two slices.

In some embodiments, the page fault handler may verify one or more values in a plurality of registers configured to record information relating to page fault interrupts.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, circuitry, embodiments, or devices shown, and the arrangements, structures, subassemblies, features, aspects, methods, processes, circuitry, embodiments, and devices shown may be used singularly or in combination with other arrangements, structures, assemblies, subassemblies, systems, features, aspects, circuitry, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors and microprocessor systems and architectures, which are apparent to those skilled in the art. It is assumed that those skilled in the art are familiar with the general architecture of processors, and in particular pre-silicon testing of processors. It may be noted that a numbered element is numbered according to the figure in which the element is introduced, and is typically referred to by that number throughout succeeding figures.

Design verification of hardware processors is generally, but not exclusively, carried out by simulating the operation of sets of assembly level test cases using a hardware simulator with a particular set of design parameters and comparing the results with the output predicted by a behavioral simulator. In the present disclosure, a "test case" is a set of stimuli to a simulation environment. The test case may comprise instructions for the simulation environment to process. The test case may further comprise initialization values to registers of the simulation environment. Design verification of hardware processors is generally, but not exclusively, carried out by simulating the operation of sets of assembly level test cases using a hardware simulator with a particular set of design parameters and comparing the results with the output predicted by a behavioral simulator. Faulty behavior of the design is detected by driving the stimuli into a design simulator and comparing the actual behavior of the design with the expected behavior implied by the input stimuli. Test requirements derived from the architecture specification usually call for the testing of every instruction, under normal and interrupt conditions. The tests written to satisfy these test requirements are called Architecture Verification Programs (AVP), and are required to run correctly on any realization of the architecture. A test program generator may be used to automatically generate the test cases.

As used herein, an "irritator" refers to a short segment of code that runs as an infinite loop in simulation on one or more threads in a simulation environment while there is at least one thread in the same simulation that is not an irritator, which is referred to as a main thread or "non-irritator" thread. The very long stream of instructions in an irritator thread is obtained by generating a code loop and then altering the test to make the code loop infinite. This loop is the salient feature of an irritator and is characterized by a finite generation sequence and an indeterminate number of executions in simulation.

The embodiments provide a simulation environment that can be used to verify the detection of asynchronous page faults. In processing systems an asynchronous page fault can arise in a multi-slice processing system. The term "multi-slice" as used in this specification refers to a processor having a plurality of similar or identical sets of components, where each set may operate independently of all the other sets or in concert with the one or more of the other sets. For example, a multi-slice processor may include, without limitation, several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, multiple processor slices may be configured to operate together. A multi-slice processor may also include, in addition to the execution and load/store slices, other processor components such as, without limitation, fetch logic, dispatch logic, and branch prediction logic.

For example, when a processor performs storage accesses for a single instruction (as defined in an instruction set architecture) as one or more disjointed storage access, complexities may arise which must be recreated by a verification process. One such complexity arises from the fact that disjointed storage accesses may be performed at different points in time by different execution "slices" resulting in part of the storage being performed with a page fault observed (due to another thread or process asynchronously turning off the valid bit in the page table entry used to translate the access) and other parts of the access not observing the page fault. The hardware design must be able to recognize such conditions and when they occur report a consistent and coherent result for the instruction's execution. Hence, the pre-silicon verification process must be able to create such asynchronous page faults, allow for a degree of unpredictability of the results, but still provide adequate checking capability to ensure observance of proper behavior by the design.

To address the above challenges, considering a first case of a simple test case where there is no page fault reported by either of two disjointed storage accesses for a given instruction. That instruction then either executes without posting any exception conditions or its execution results in another type of synchronous exception being posted (i.e. something other than a page fault) for both accesses. When either the instruction executing is the only thread in the test case or it is executing in a multi-threaded test case in which the other threads never alter the page table entry (PTE) used to translate the storage access of this thread, the results of the test case are predictable. Specifically, the test is able to predict how the instruction should execute deterministically. In other words, based on the specific scenario of the test, it reliably predicts the outcome of executing the instruction.

However, if another thread is added to the test case which randomly and in a non-synchronized manner turns the valid bit in the PTE used to perform the storage access on and off (to mimic how a typical operating system or hypervisor might reclaim a page in memory), it could result in an asynchronous page fault occurring during simulation. This would make the predicted results of the test case become unreliable for checking purposes and thus, avoided by a test case generator. Therefore, a stimulation testing environment needs to be generated that creates a proper stimulus for randomly creating asynchronous page faults and also checks for consistency in the results produced by the design, while allowing for some degree of unpredictability.

Figure 1:
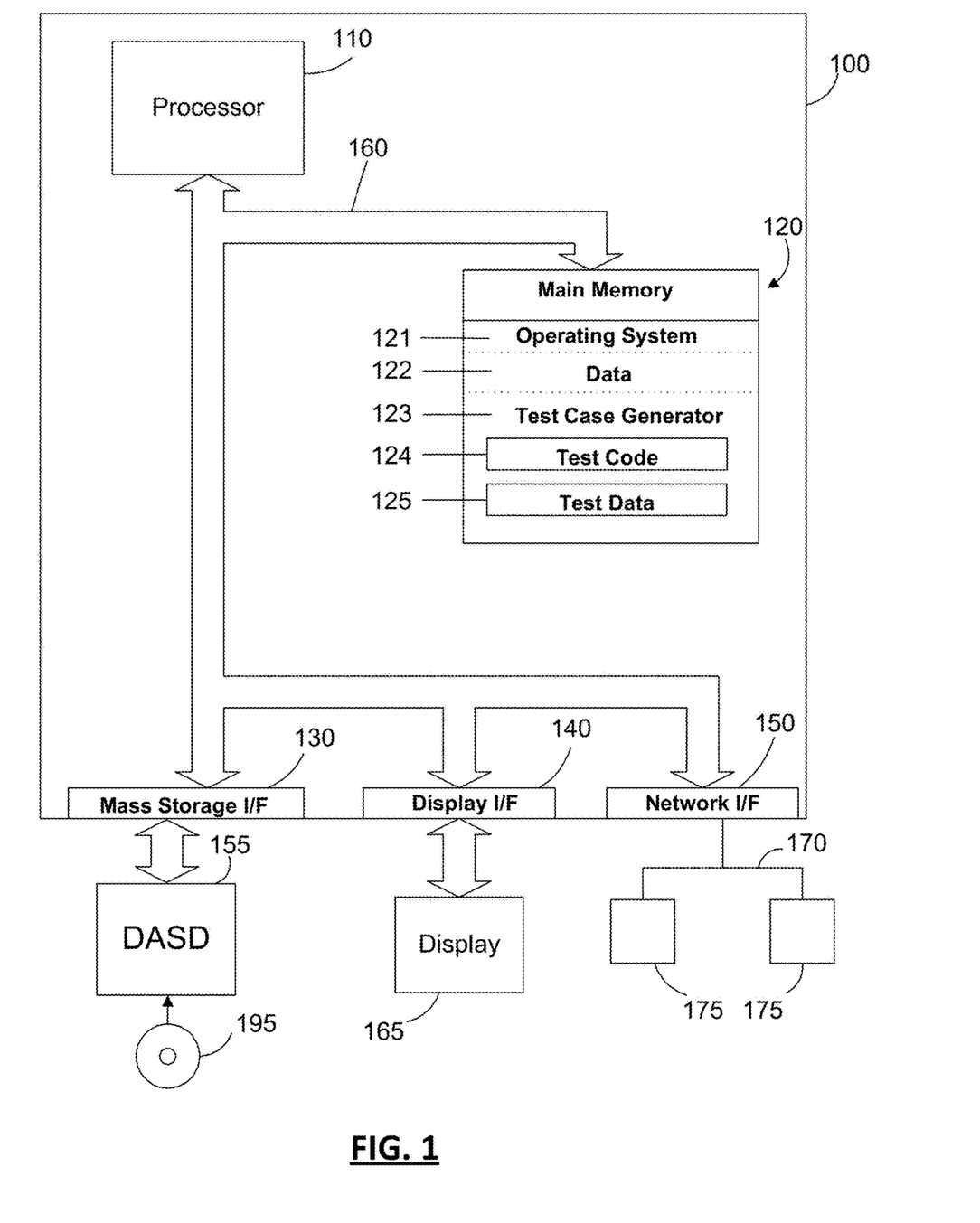
FIG. 1 depicts one example of a computing environment.

Referring to FIG. 1, a computer system 100 is one suitable implementation of a computer system that is capable of performing the computer operations described herein including a test case generator for generating test cases for verifying and validating a processor design and/or a test case executor as described herein. Computer system 100 is a computer which can run multiple operating systems. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Some devices may have a removable memory card or similar for a direct access storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and a test case generator 123. The memory 120 also includes test code 124 and test data 125 which is typically created by the test case generator 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, data 122, test case generator 123, test code 124 and test data 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the test case generator 123 to generate the test code 124 and the test data 125 as directed by a user.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
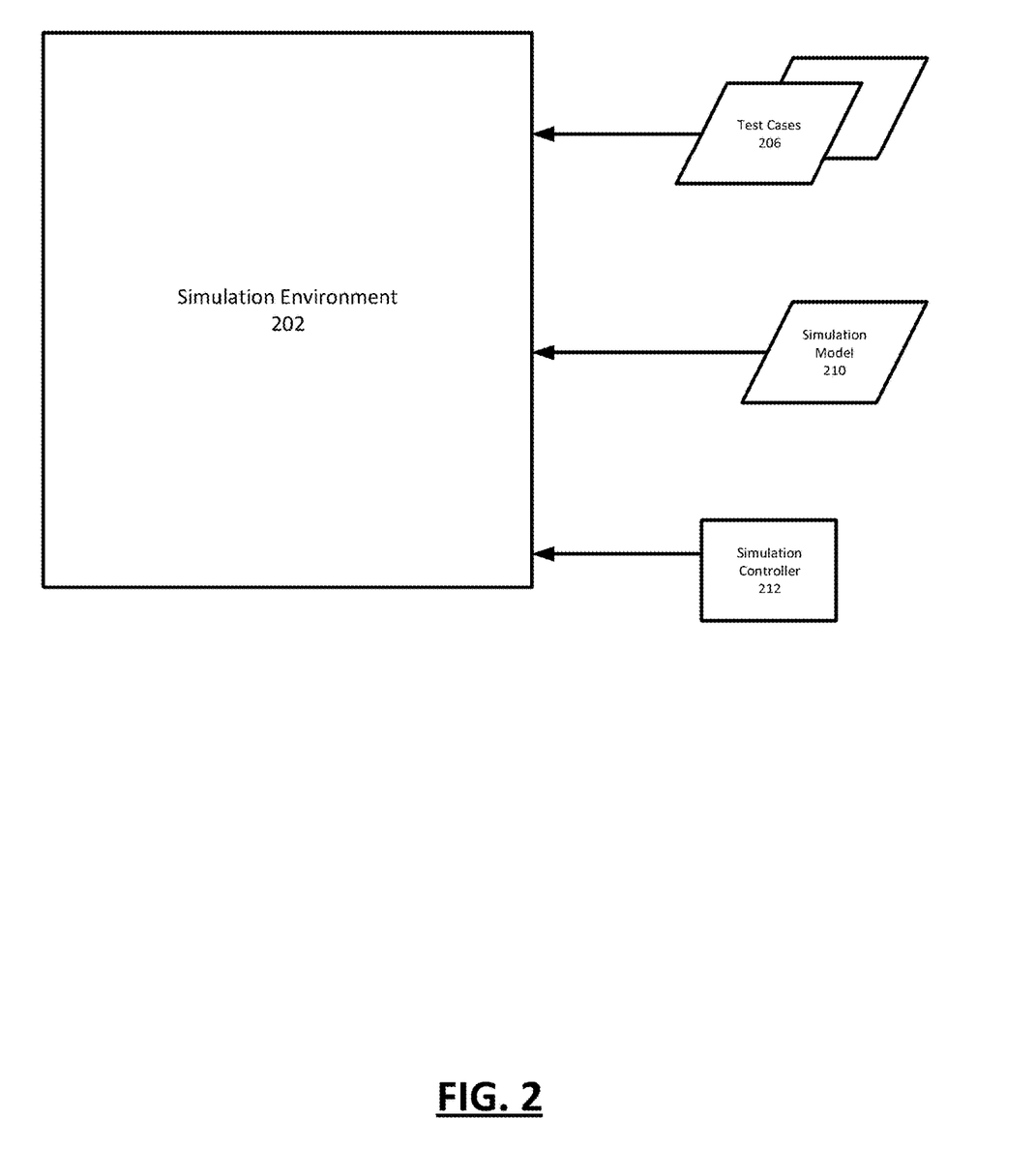
FIG. 2 is a diagram depicting logical components of an illustrative system for generating a processor core simulation environment for performing verification of asynchronous page fault detection.

FIG. 2 is a diagram depicting logical components of a system for generating a processor core simulation environment for performing verification of asynchronous page fault. In general, simulation environment 202 provides a hardware and software framework for verifying that a processor core design will function properly before the processor core is actually manufactured. Simulation environment 202 is a software simulation environment that includes, for example, a suite of simulation and verification tools that assist a user in conducting pre-silicon simulation and verification of integrated circuit designs. Simulation environment 202 allows a user to load simulation models of integrated circuit designs and simulate operation of those designs in various test cases. For example, using simulation environment 202, a user can load simulation models of a microprocessor design having a cache memory including registers and main memory, simulate how the microprocessor fetches main memory entries and writes those entries to the cache memory, and also simulate how the microprocessor performs detection of page faults. Simulation environment 202 may be implemented using, for example, commercially available tools such as the simulation software packages available from Cadence Design Systems, Inc. of San Jose, Calif. In general, simulation environment 202 can be any software or combination of software that enables a user to model integrated circuit designs and components and simulate test cases in accordance with embodiments of the present invention.

In an embodiment, simulation environment 202 is initiated and configured by a simulation model 210. Simulation model 210 comprises data describing the design of a simulated processor core. Simulation model 210 includes data representing various components of a processor core such as the electronic logic and memory for the processor core, and further includes data describing how the components are connected and other operational details of the processor core. An example of a simulation model used in some embodiments is a logical netlist generated out of VHDL (Very high speed integrated circuit Hardware Description Language).

Test cases 206 comprise data that describes various tests that can be executed to test aspects of a processor core. For example, various test cases may exercise the arithmetic logic, floating-point operations, memory operations (e.g., load-store operations) and cryptography operations of a processor core. Test cases 206 include the instructions for the test case, the initial values of registers and memory, input stimuli, and the expected results for the test cases. In some embodiments, the data for a test case is provided in a text file referred to as an architecture verification program (AVP) file.

Simulation environment 202 reads the simulation model 210 and the test case 206, and executes the test cases against a simulated processor core that operates according to the design specified in simulation model 210. The simulated processor core for performing the verification of asynchronous page fault detection of the current disclosure is designed as a multi-slice multi-threaded processor and is described below with respect to FIG. 3.

Simulation controller 212 emulates the instruction execution cycles of a processor designed according to simulation model 210. In other words, simulation controller 212 executes the test case in the simulation environment 202 to simulate how a processor core specified by simulation model 210 would execute the instructions in the test case given the initial conditions and stimuli provided in the test case. Simulation controller 212 may also detect design bugs, such as hang conditions, control logic problems, or the like, which result in the system not recognizing the occurrence of a page fault, mis-recognizing the occurrence of a page fault, and/or improper handling of a page fault. If the expected results are achieved, then the test case is considered passed. If the expected results are not achieved, the test case is considered failed. A failure of a test case may indicate an error in the design of the processor core. The simulation controller 212 may monitor the execution of the test case in the simulation environment and the verification engine. The simulation controller 212 may use built-in error detection in the hardware and/or check for other design bugs, such as micro-architectural rule violations, correctness of the non-irritator thread architectural results, or the like, against the predicted results of the test case (in some embodiments, provided by the verification engine). Simulation controller 212 may then return test results 116 to a user.

Figure 3:
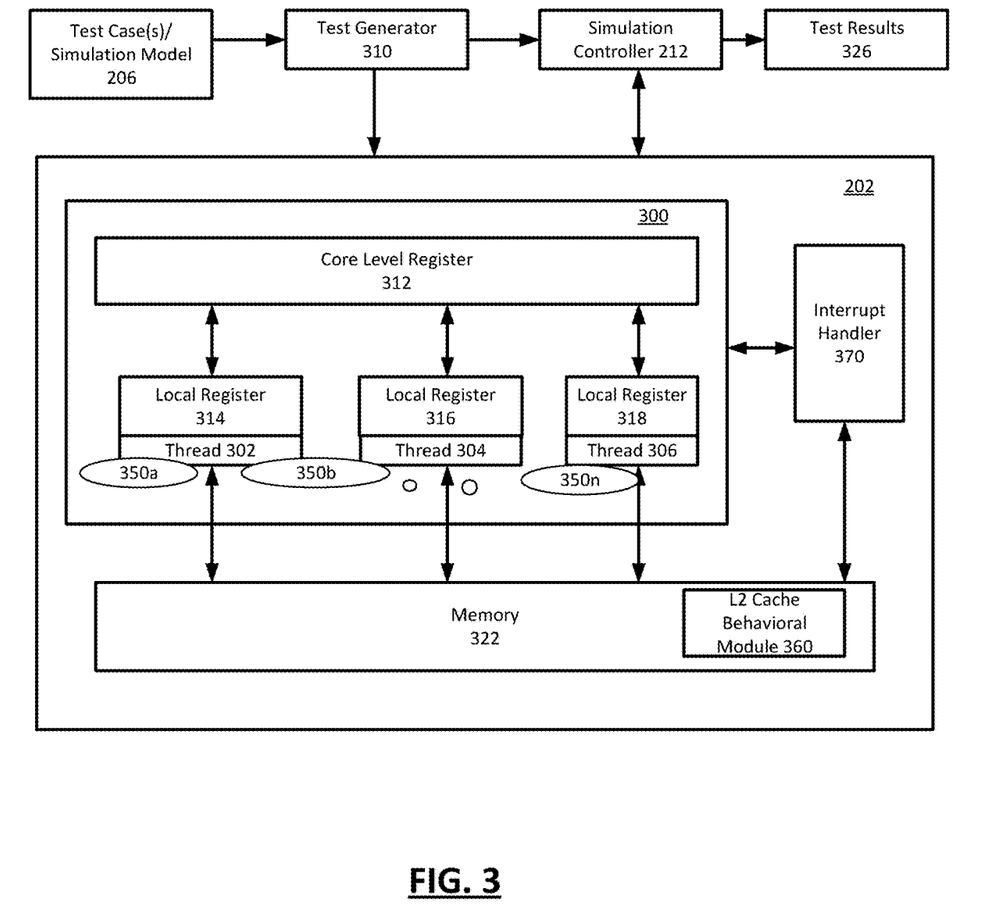
FIG. 3 depicts an exemplary implementation of a simulation environment for verifying the detection of an asynchronous page fault.

FIG. 3 depicts an exemplary implementation of a simulation environment 202 for verifying the detection of an asynchronous page fault in accordance with an illustrative embodiment. In an embodiment, the simulation environment 202 for verification of asynchronous page fault detection may include a simulated multi-threaded and multi-slice microprocessor system 300 comprising three threads 302, 304, and 306, each of which is capable of processing instructions generated by test generator 310. In an embodiment, the microprocessor system 300 comprises a plurality of processing slices (350a, 350b, . . . 350n).

While the illustrative embodiments depict three threads, the disclosure is not so limiting. That is, the illustrative embodiments may be implemented in more or less than three threads. Threads 302, 304, and 306 have access to common core level register 312 and their own respective local register 314, 316, and 318. Additionally, threads 302, 304, and 306 have access to memory 322. In an embodiment, the memory 322 may include various address translation structures such as a page table, a segment table, a TLB, or the like. In an embodiment, the memory 322 may be initialized according to a test case. For example, a test for verification of asynchronous page faults may initialize the memory to store operands at doubleword boundaries (or other boundaries) that are accessible by execution of load operations. Furthermore, page table entires(s) corresponding to the location of the operands may be configured according to the test case (described below).

Once a user, such as a test operator, administrator, or the like, defines test cases 206 that will be used to verify the detection of asynchronous page faults, test generator 310 takes test cases 206 and generates non-irritator thread code that will be executed by a non-irritator thread, which for this example, is thread 302. On a non-irritator thread a very controlled instruction stream may be generated. In an embodiment, the non-irritator thread code that thread 302 executes may be a storage access code that comprises a plurality of load instructions, at least some of which span the width of multiple execution slices. In an embodiment, the thread code comprises at least one hundred (100) load instructions, each of which causes at least two of the processing slices 350a, 350b, . . . 350n to perform a storage access.

For example, the load instructions of thread code executed by thread 302 span the width of multiple execution slices. In other words, the load instructions cross at least one slice boundary (e.g., between slices 350a and 350b) such that they cause both the slices 350a and 350b to load the requested bytes of data or operands to two general registers from the memory 322 as two disjointed storage accesses. In an embodiment, test generator 310 may store the non-irritator thread code for thread 302 in register 314 or in core level register 312.

When a slice executes a load instruction for a storage access, it translates the virtual address (or effective) of the requested storage access and translates it to a real address or physical address in memory. Address translation in a virtual memory system typically incorporates accessing various address translation data structures. One such structure, referred to as a page table, includes multiple entries (PTEs) that map virtual addresses to real addresses on a page-by-page basis. A PTE represents a page of data residing in physical memory.

In some embodiments, the storage accesses in the load instructions are configured to use the same page table entry (PTE) (however, the disclosure is not so limiting). Upon initialization of the simulation environment 202, the valid bit in the PTE (or page table entries if the storage access spans multiple pages as described below) is assigned an initial value 1. In other words, the valid bit is turned "ON" indicating that the page corresponding to the storage access exists in memory 322. When the valid bit is turned "OFF" (i.e., its value is 0), the page corresponding to the storage access exists in memory 322 and a "page fault" occurs.

To accelerate address translation, high speed caches (e.g., translation lookaside buffers (TLB), effective to real address translation (ERAT) cache, etc.) are typically used to cache recently-used PTEs for quick access by the computer. Finding a mapping or match in a given high-speed cache between a virtual address and a physical address indicates that the page is available in the physical memory. Not finding a mapping or match in a given high-speed caches does not exclude a possibility that the page could be available in the physical memory, and the page table should be additionally checked (e.g., using a page table walk) before a definitive answer can be had about the existence of the page in the physical memory. The contents of a PTE cached in a high speed cache typically does not include the valid bit.

Furthermore, the data or operands corresponding to the storage accesses are aligned in memory 322 (for example, when the memory is initialized) such that subsequent bytes of the disjointed access cross into different memory boundaries. In an example embodiment, if the boundaries reside on a doubleword (i.e., an 8 byte boundary), for every storage access, at least two bytes are accessed and loaded into a register. Furthermore, the starting byte of the access is aligned such that subsequent bytes of the disjointed access cross into different doubleword boundaries. For example, if the size of the storage access operand is 8 bytes, the storage access operand must be defined such that it is not aligned on a doubleword boundary to ensure that the storage access occurs as two disjointed accesses executing on different slices on the design. While the doubleword boundary is used as an example, other boundaries such as single word, quadword, or the like are within the scope of this disclosure, depending upon the organization of memory.

Additionally and/or optionally, the load instructions included in thread 302 may also cross a page boundary. For example, the starting byte of the storage access instruction may be written within the storage access operand size minus one byte of the end of the page boundary. In other words, to implement a page crossing, the target storage operand address of the load instruction must be within 7 bytes of the end of the page boundary (when the boundaries reside on a doubleword). For instance, for a 4 KB page, the last 3 nibbles of the memory address of the storage access are configured to be in the range of 'XXXXXXXXXXXXXFF9'x to 'XXXXXXXXXXXXXFFF'x.

In an embodiment, the test generator 310 also generates two irritator thread codes to be executed by, for example, threads 304 and 306. An irritator thread may be composed of a short instruction sequence which is contained within the body of an infinite loop. Even though an irritator thread resides in the body of an infinite loop, only one pass of the loop is actually generated to conserve generation time. After the test is generated, the test case is post-processed to change the loop count from a single iteration into a very large (i.e. infinite for all practical purposes) loop count such that when the test runs in simulation or on real hardware, the irritator threads will run indefinitely. Once the non-irritator thread has finished executing its entire instruction stream (i.e., all the load instructions), the non-irritator thread may perform one or more operations that would cause the irritator thread (s) to terminate execution. For example, the non-irritator thread may store a no-op instruction into the instruction streams of each of the irritator threads, turning the branch instruction that created the infinite loop on the irritator threads into a no operation or "no-op" instruction which thereby terminates the irritator threads. Instructions in a loop may be changed while the loop is being executed without the need for any synchronization between the threads.

Alternatively, the irritator thread may be executing code that reads from a specific address until the value in the address equals a specific value. Then once the non-irritator thread has finished executing its entire instruction stream, the non-irritator thread may write the expected value to the address being read by the irritator thread. The result is an efficiently generated multi-threading instruction level test case which guarantees: balanced length of all instruction streams within the test, aggressive cross thread interaction of the desired scenario since the irritator threads are constantly causing the desired affect while the non-irritator thread is running, and efficient test generation since the irritator threads instructions are very short to generate (typically one or two instructions or a short sequence of instructions) which execute indefinitely until the non-irritator thread terminates the irritator threads.

The test generator 310 also generates irritator thread code to change the loop count from a single iteration of code defined in the test definition into a very large (i.e. infinite for all practical purposes) loop count such that threads 304 and 306 will execute their respective irritator thread codes indefinitely. Again, the code that threads 304 and 306 execute may be composed of a short instruction sequence which is contained within the body of an infinite loop. Each irritator thread code is restricted in the corresponding irritator thread code and may not cause any unexpected exceptions or interrupts, may not modify any of memory 322 that is read by thread 302, may not modify any of core level register 312, and any architected results of the execution of the irritator thread code may be undefined. That is, depending on how an irritator thread is written, the illustrative embodiments may not be able to check the architectural results of the irritator threads against simulation test case, as the irritator threads are used to find problems in the non-irritator thread (primarily) whose architected state may be checked on an instruction-by-instruction basis as long as the irritator threads adhere to the described restrictions. Test generator 310 may store the irritator thread code for threads 302, 304, and 306 in registers 314, 316, and 318 or in core level register 312.

In an embodiment, the first irritator thread code (for example, corresponding to thread 304) includes a load instruction executed in an infinite loop that is configured to cause one of the processor slices (e.g., slice 350b) executing an instruction of the non-irritator thread (i.e., when the instruction spans multiple slice widths) to perform a separate storage access. The multiple repetitive executions of a storage access by the same processor slice overloads that processor slice and slows down its execution of the non-irritator thread code instruction and allows the other slice(s) (i.e., slice(s) not affected by the irritator thread) to process it's piece of the disjointed storage access faster than the slice being inundated by the irritator thread. This in turn facilitates the occurrence and observation of an asynchronous page fault by some of the processor slices executing an instruction and not by the inundated slices when the instruction being executed spans the width of multiple slices (as discussed below). In an embodiment, the load instructions included in the second irritator thread code are configured to perform storage accesses that do not cross over into other processor slices (i.e., the slices that are not inundated by the irritator thread). For example, if the boundaries in the memory 322 reside on a doubleword boundary, the load instructions are configured to perform a 1-byte storage access (example, an "lbz" instruction on a POWER ISA processor). However, the disclosure is not so limiting and irritator thread may include 2-byte, 4-byte, or other load instructions.

In an embodiment, the second irritator thread code (for example, corresponding to thread 306) is configured to invalidate the caching of the PTE (or PTEs) in a high-speed cache after address translation is performed for the requested storage access. The first irritator thread code performs the invalidation using any now or hereafter known invalidation methods. For example, the first irritator thread code may include a "tlbie" instruction executed in an infinite loop in a POWER ISA. In an embodiment, invalidation of caching of the PTE allows the non-irritator thread to skip the high speed cache and retrieve the PTE directly from the page table every time a storage access is performed during simulation of the AVP. The corresponding reads of the PTE from the page table provides opportunities for the slices to observe a simulated page fault by analyzing the value of the valid bit on some of the slices but not on other slices of the processor (since as discussed above the contents of a cached PTE do not include the valid bit). It should be noted that placing the caching invalidation instruction on a different thread than the non-irritator thread performing the slice crossing storage accesses allows for more randomness in the simulation since the invalidation instruction may be synchronizing in nature on the thread executing it.

In some embodiments, the simulation environment 202 also includes a L2 cache behavioral module 360 that interfaces with the simulated processor core 300 of the simulation environment 202. In an embodiment, the L2 cache behavioral module 360 is a software module that is called by processor core 300 and mimics the rest of the computing system. L2 cache behavioral module 360 receives test code generated by the test generator 310 and executes it to receive information regarding storage access sequences being performed within simulation environment 202, and operates to randomly turn off the valid bit of PTEs being fetched in the simulation environment 202 based on the test-case being simulated, as explained in greater detail below. L2 cache behavioral module 360 can be implemented, for example, in the form of a custom module or plug-in for processor core 300.

In an embodiment, issuance of the PTE fetch request by a processor slice triggers the execution of an operation by the L2 cache behavioral module 360 which randomly turns OFF the valid bit of the PTE returned by the page table in memory. The turning OFF of a valid bit of a PTE will cause the processor slice receiving the PTE to record a page fault interrupt.

While the L2 cache behavioral module 360 is shown stored in memory 322, it may be stored in other memory or implemented in other logic/modules of simulated processor 300. While this disclosure describes a L2 cache behavioral module for randomly turning off the valid bit of a PTE retrieved by a processor slice, other methods may be used without deviating from the principles of the current disclosure. For example, a third irritator thread may be executed by the processor core 300 for turning the valid bit OFF.

Whenever a page fault is observed during pre-silicon simulation, it is handled by a page fault handler module 370 in the simulation environment 202. When a page fault interrupt is generated, the page fault handler 370 is invoked to restore the valid bit of the pertinent PTE. In addition, the page fault handler 370 returns the execution of the test back to the instruction which observed the page fault.

Interrupts (e.g., page faults) are used in computers to allow a wide variety of devices to obtain the attention of the computer processor, in order to request services, or report problems that are not in sync with processor instruction execution. When a processor receives an interrupt, it usually suspends its current operations, saves the status of its work (the processor "context"), and transfers control to a special routine known as an interrupt handler (e.g., a page fault handler). The interrupt handler contains instructions for dealing with the particular condition that caused the interrupt. A table stored in memory contains pointers (vectors) which provide the addresses of various instructions making up the interrupt handlers.

Prior art page fault handlers used in pre-silicon simulation AVP's merely verified the occurrence of a page fault, recorded the corresponding information, and then the test case execution was configured to skip ahead to the next instruction in the test case without attempting to correct the cause of the page fault. While this approach is adequate for verifying predictable synchronous page faults, when the L2 cache behavioral is used to randomly turn OFF the valid bit when the core reads the PTE from memory, the page fault handler must also correct the page fault to be able to verify detection of an asynchronous page fault. Hence, the page fault handler 370 of the current disclosure may turn the valid bit back ON in the PTE, and return execution of the AVP upon exit of the page fault handler to the same instruction which originally incurred the page fault. In an embodiment, the page fault handler 370 is in communication with the L2 cache behavioral module 360 and as such knows the identity of the PTE for which the valid bit was turned OFF.

Typically, appropriate updates to registers which record the cause of an interrupt (e.g., a page fault), the address of the storage access and the instruction address are predicted to be updated by the test results. These predicted results in the test case are then verified against the hardware design behavior observed during pre-silicon simulation of the design via the simulation environment run-time checking code on an instruction-by-instruction basis ("IBI checking"). For example, in the POWER ISA, for a Data Storage Interrupt (DSI), the cause of an exception or interrupt (e.g., a page fault) would be recorded in a data storage interrupt status register (DSISR), the address of the corresponding storage access would be recorded in a data address register (DAR), and the address of the instruction itself would be recorded in the save restore register 0 (SRR0). However, the test case of the current disclosure for creation of asynchronous page faults can not predict exactly if, when, or where a page fault will occur and the page fault handler might be invoked. Hence, the IBI checking normally employed to check for correctness of the design against the test case results cannot be employed.

Therefore, in an illustrative embodiment, test case self-checking instructions (also included in the non-irritator thread code) may be executed by the page fault handler 370 to check that if an interrupt occurred because of an asynchronous page fault and to determine if the interrupt is properly handled. For example, the appropriate registers (e.g. DSISR, DAR) are correctly updated with reasonable values in order to facilitate detection of design bugs. The page fault handler 370 may then verify the correctness of the appropriate registers (e.g. DSISR, DAR) to ensure that the values contained within those registers are reasonable based on the stimulus being applied. For example, since the test is constrained to only use one PTE (or two in the case of the page crossing case), the value in the DAR must be one of the two allowed values. Any other value would be indicative of a design bug. Additional checks to ensure other exception or interrupt recording registers such as the Hypervisor Data Storage Register (HDAR), Hypervisor Data Storage Interrupt Status Register (HDSISR) and the Address Space Data Register (ASDR) have not been altered when the DSI is taken (since those registers should only be updated when an HDSI is taken) can also be performed. In other type, the page fault handler 370, ensures that the hardware design processes and records the correct interrupt type (DSI or HDSI).

Once test generator 310 stores the non-irritator thread code (including the page fault handler code), the irritator thread codes, the L2 cache behavioral operation code, the test generator 310 sends a complete test case to simulation controller 212 for execution. Simulation controller 212 loads the test case into a simulation model, such as a Very-High-Speed Integrated Circuits (VHSIC) hardware description language (VHDL) simulation model, a Verilog® simulation model, an Advanced Boolean Equation Language (ABEL™) simulation model, or the like. Simulation controller 212 then begins clocking of the simulator, and instantiates the threads 302, 304, and 306 to execute their respectively assigned code. While threads 304 and 306 execute the irritator thread code, thread 302 executes the non-irritator thread code. Furthermore, the L2 cache behavioral operation codes and the interrupt handler codes are invoked upon occurrence of suitable conditions (i.e., fetch PTE instruction and asynchronous page fault detection, respectively) during execution of thread 302. Once thread 302 finishes executing the entire instruction stream of non-irritator thread code, thread 302 may perform one of a number of operations that causes threads 304 and 306 to terminate. Thread 302 may store a no-op instruction into the instruction streams of each of the irritator threads, turning the branch instruction that created the infinite loop on the irritator threads into a no operation or "no-op" instruction which thereby terminates the irritator threads, or thread 302 may write an expected value to one or more addresses being read by threads 304 and 306 thereby terminating threads 304 and 306.

As discussed above, simulation controller 212 may monitor the execution of the non-irritator thread code and the irritator thread code by threads 302, 304, and 306, in addition to the output of the page fault handler to record any design bugs that may occur during the execution of the non-irritator thread code and the irritator thread code. Simulation controller 212 may detect design bugs, such as hang conditions, control logic problems, or the like, which result in a machine check condition, using built-in error detection (e.g., page fault handler) in the hardware and/or check for other design bugs, such as micro-architectural rule violations, correctness of the non-irritator thread architectural results, or the like, against the predicted results of the test case. Simulation controller 212 may then return test results 216 to the user.

Figure 4:
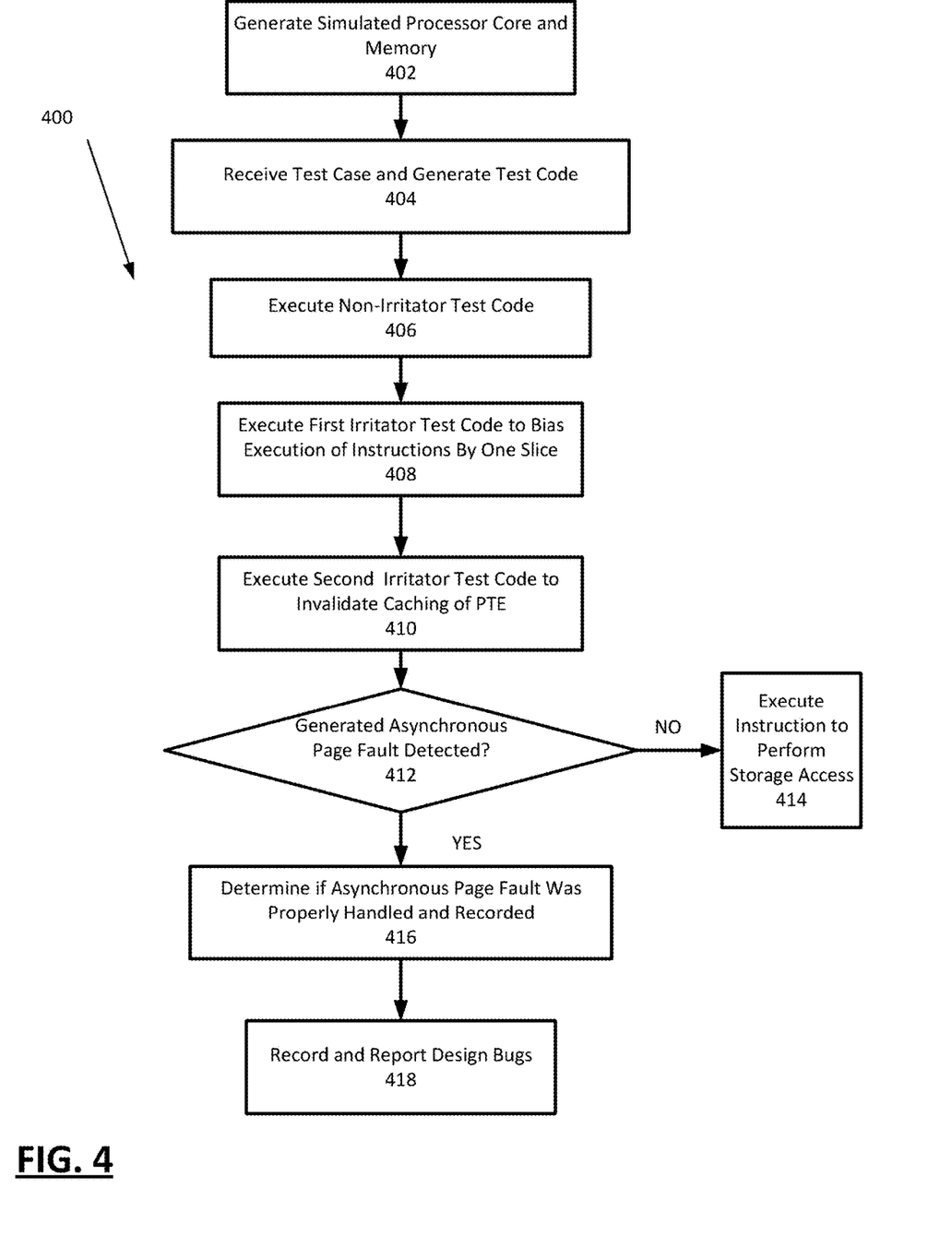
FIG. 4 is a flowchart illustrating and describing an example method for verifying the detection of an asynchronous page fault.

FIG. 4 an exemplary flowchart in accordance with various embodiments illustrating and describing a method of verifying the detection of asynchronous page faults in the simulation environment as described in FIGS. 2-3. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4 but the process may be integrated and/or one or more steps may be performed together, simultaneously, or the steps may be performed in the order disclosed or in an alternate order.

At step 402, the system may generate the simulated processor core and memory in the simulation environment based on a simulation model received from a user, as described above with respect to FIG. 3. Specifically, the simulation environment may include a multi-threaded multi-slice processor core configured to execute at least one non-irritator thread and at least two irritator threads. Furthermore, the simulated processor core may include, without limitation, a core level register, local registers, and a page fault handler. In addition, the processor core may be in communication with (e.g., via an API) a L2 cache behavioral module (e.g., in the memory) configured to execute a L2 cache behavioral operation code within the instruction of the non-irritator thread. The simulated memory may include operands aligned at a doubleword boundary as discussed above.

In an embodiment, the system is configured to execute a test case in the simulated environment to verify the detection of asynchronous page faults during the execution of disjointed storage access instructions in the simulated processor. At 404, the system receives a test case and generates test code for verifying detection of an asynchronous page fault. As discussed above, the test code includes a non-irritator thread code comprising a plurality of load instructions and spanning the width of at least two processor slices.

At 406, the system executes the non-irritator thread code in the simulated processor core of the simulated environment (as described below in detail in FIG. 5).

At 408, the system executes a first irritator thread code in the simulated processor core of the simulated environment to bias against the execution of the non-irritator thread code instructions by one of the at least two slices. As discussed above, the instructions in non-irritator thread span the width of at least two processor slices and hence are executed by the at least two processor slices of the simulated processor core. The non-irritator thread core may perform the biasing by causing that one of the slices corresponding to the instructions in the non-irritator thread code to continuously execute a load operation (i.e., a separate storage access) in an infinite loop. This may cause the slice executing the infinite loop load instruction to lag behind the other slice(s) in execution of the non-irritator thread load instructions, and generate an opportunity for creation of an asynchronous page fault and its detection. In other words, since execution of an instruction via the two processor slices becomes out of sync because of the induced biasing, an asynchronous (or out-of-order) page fault may be created that is detected by one slice and not the other. For example, if the valid bit of a PTE is turned off before it is returned to the non-biased slice and then restored by the page fault handler before it is returned to the biased slower slice, only the non-biased slice may report an interrupt. Similarly, the valid bit may be on when returned to the non-biased slice and then turned off by the L2 cache behavioral operation before it is returned to the biased slower slice such that only the biased slice may report an interrupt.

As discussed below with respect to FIG. 5, execution of the load instructions in the non-irritator thread code includes a translation process comprising retrieving a PTE corresponding to the physical address of the memory. As is known to those skilled in the art, in a conventional process, the translation path including the retrieved PTE is cached in a fast access cache (e.g., TLB) for future storage accesses. In order to prevent caching of the PTE in the fast access cache, the simulated processor core may also execute a second non-irritator thread code of the test case to invalidate caching of the PTE (or any other part of the translation process) at 410. This may be performed using the methods described above in the discussion of FIG. 3.

At 412, the system determines whether an asynchronous page fault has been detected by the simulated design. As described, an asynchronous page fault is generated during the execution of the test code when the L2 cache behavioral operation randomly turns the valid bit off when it returns to the core a PTE requested by a simulated processor core slice. Thus, the system determines that an asynchronous page fault was detected when a page fault is observed by only one of the processor slices executing an instruction of the non-irritator thread code, and the remaining slices executing the same instruction do not observe that page fault If an asynchronous page fault was detected (412: YES), the system (e.g., the simulation controller) may determine (416) whether the asynchronous page fault was properly handled and recorded (for example, by analyzing the results of the test case (including those provided by the interrupt handler)). In an embodiment, the hardware design being tested must be able to detect and handle the asynchronous page fault by erring on a worst case scenario. Furthermore, since an asynchronous page fault is not caused by the execution of an instruction, the page fault handler should be able to take actions to overcome the interrupt and return the execution to the instruction that encountered the page fault. An asynchronous fault is properly handled by the interrupt handler if it properly returns execution to the original instruction and/or turns the valid bit of the PTE back ON. The system may determine that the page fault was properly recorded by verifying the values in various registers configured to record information relating to the asynchronous page fault (e.g., in DAR, HDAR, DSI, HDSI, etc. according to POWER ISA requirements).

The system may record a design bug (418) if the asynchronous page fault was not properly detected, handled appropriately and/or if the values in the registers (e.g., DAR, HDAR, DSI, HDSI, etc.) are not reasonable based on the stimulus being applied.

If an asynchronous page fault was not detected (412: NO), then the execution of the instruction continues to perform the storage access normally.

The system may also analyze the results of the test case execution and compares them against results expected for the applied stimuli to determine if there is a design bug unrelated to asynchronous page fault verification and handling.

The system executes steps 406-416 until all the instructions in the non-irritator thread code have been executed. Once the thread that is executing the non-irritator code finishes executing the entire instruction stream of non-irritator thread code, the non-irritator thread performs one of a number of operations that cause the thread(s) executing the irritator thread code to terminate. The system then returns any design bugs that were recorded by the system as a result of the execution of the non-irritator thread code and the irritator thread code to the user in the form of test results (418), with the operation terminating thereafter.

Figure 5:
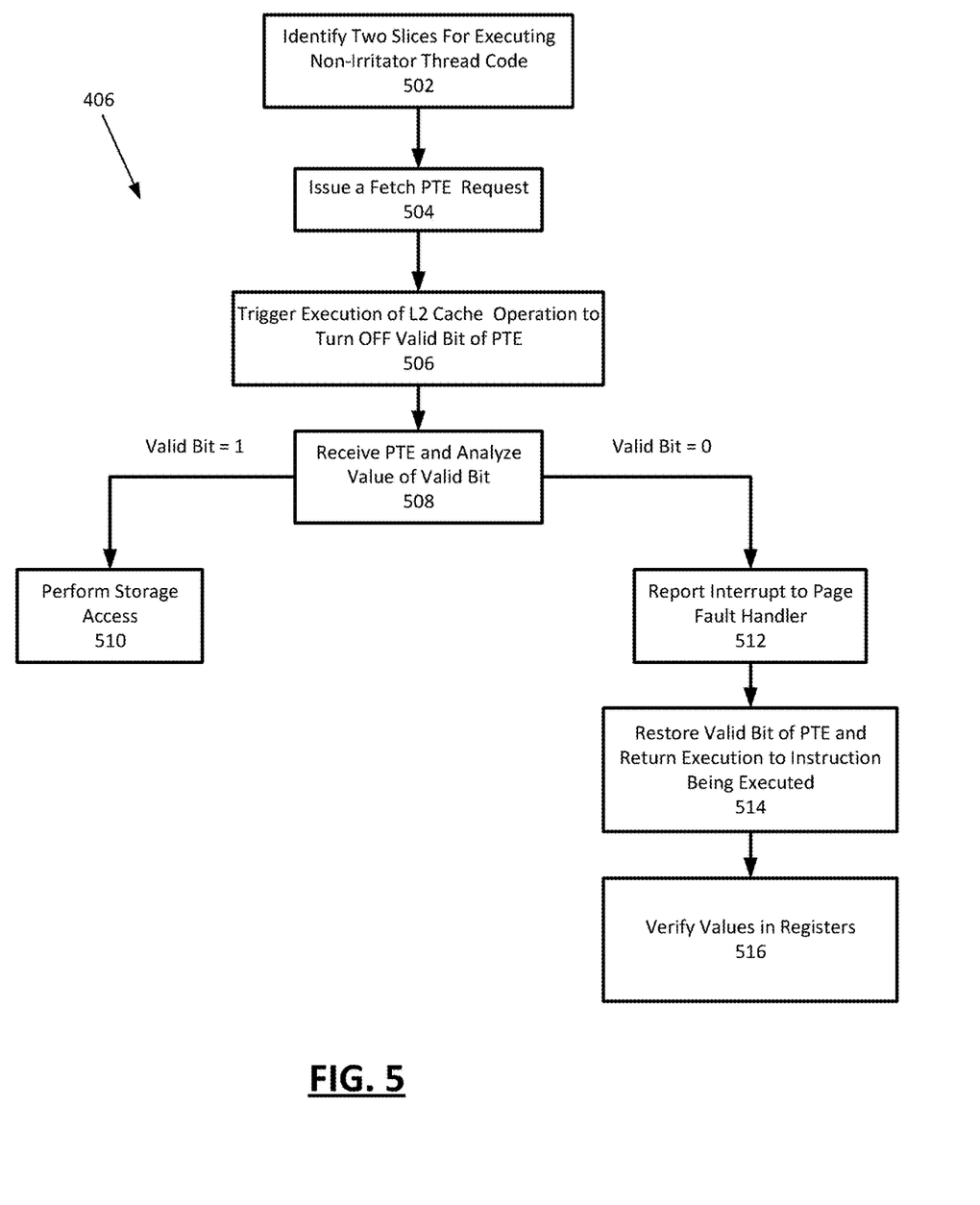
FIG. 5 is a flowchart illustrating and describing an example method for execution of a non-irritator thread code.

FIG. 5 is an exemplary flowchart in accordance with various embodiments illustrating and describing a method of execution of a non-irritator thread code of a test case in a simulated processor core as described in FIGS. 2-3. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5 but the process may be integrated and/or one or more steps may be performed together, simultaneously, or the steps may be performed in the order disclosed or in an alternate order.

At 502, the simulated processor core may identify at least two slices for executing the non-irritator thread code of the test case that comprises a plurality of load instructions (e.g., doubleword). Specifically, each load instruction in the non-irritator thread code may cause at least two slices of the simulated processor core to execute a storage access into a memory.

In an embodiment, each of the identified slices may execute one or more steps to translate the storage access address included in each instruction (e.g., a virtual address)

to a physical address of the memory. For example, the slices may perform a TLB search, a page walk, or the like to identify a PTE from the virtual address, where the PTE provides a physical address in the memory for performing the storage access. As discussed above, since an irritator thread continuously invalidates the caching of the PTE in a fast access cache (such as a TLB), the address translation will always cause a page walker in the memory to perform a page table walk. Hence, at 504 the simulated processor core may issue a fetch PTE request (for each instruction in the non-irritator thread) to the memory.

In some embodiments, issuance of the PTE fetch request by a processor slice of the simulated processor core may trigger the execution of a L2 cache behavioral operation (506) that turns OFF the valid bit of the requested PTE in the page table of the memory. The L2 cache behavioral operation is always executed within the bounds of the outer transaction (i.e., the non-irritator thread load instruction execution) by a L2 cache behavioral operation module via, for example, an API into the memory. In an embodiment, execution of the L2 cache behavioral operation may be triggered randomly in response to issuance of some but not all of the PTE fetch requests in the non-irritator thread code.

In some embodiments, if the L2 cache behavioral operation is triggered to turn off the valid bit of the PTE in the page table, the L2 cache behavioral operation module may report the execution of the L2 cache behavioral operation and the identity of the PTE to a page handler of the simulated processor core.

At 508, the simulated processor core may receive the requested PTE from the memory and may analyze it to determine the value of the valid bit in the PTE. If the value of the valid bit in the PTE is 1 (i.e., valid bit ON), the simulated core may use the PTE to perform the storage access (510). And, if the value of the valid bit in the PTE is 0 (i.e., valid bit OFF), the simulated core may observe a page fault and may report an interrupt (512) to the page fault handler.

At 514, the page fault handler executes page fault handler test to restore the valid bit of the PTE in memory to ON. The page fault handler receives information relating to the identity of the corrupted PTE (i.e., PTE for which the valid bit was turned OFF from the L2 cache behavioral operation module).

At 516, the page fault handler may verify that the values contained within various registers for recording storage interrupts (e.g., DAR, DSISR, HDAR, HDSISR, ASDR, etc.) are correct according to the type of page fault observed and/or not observed.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 4 and FIG. 5, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Figure 6:
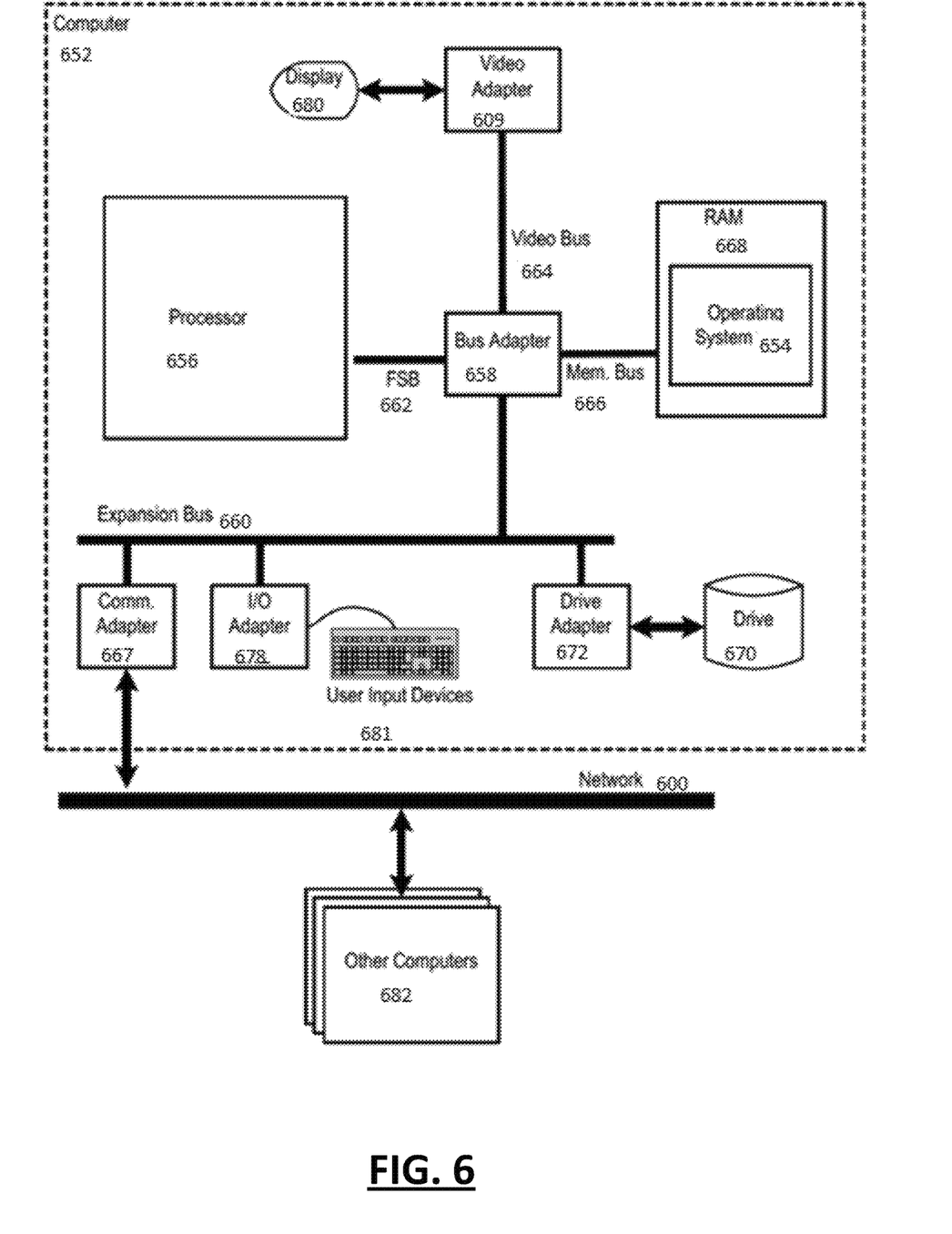
FIG. 6 is a functional block diagram illustrating a computer system, according to embodiments of the present disclosure.

FIG. 6 is a functional block diagram illustrating a computer system 60. The system 600 includes an example of automated computing machinery in the form of a computer 652.

The computer 652 may include at least one processor 656 or central processing unit ("CPU") as well as random access memory 668 ("RAM"), which is connected via a high speed memory bus 666 and bus adapter 658 to the processor 656 and to other components of the computer 652.

The processor 656 may be implemented as a multi-slice processor. The term "multi-slice" may refer to a processor having a plurality of similar or identical sets of components, in which each set of components may operate independently of all the other sets or in concert with the one or more of the other sets.

Although the processor 656 is shown to be coupled to RAM 668 through the front side bus 662, the bus adapter 658, and the high speed memory bus 666, those of ordinary skill in the art will recognize that such configuration is only an exemplary implementation and other configurations of coupling the processor 656 to other components of the system 60 may be utilized. For example, in some embodiments the processor 656 may include a memory controller configured for direct coupling to the memory bus 666. Yet, in other embodiments, the processor 656 may support direct peripheral connections, such as Peripheral Component Interconnect express ("PCIe") connections and the like.

An operating system 654 may be stored in RAM 668 of the computer 652. Operating systems, useful in computers configured for operation of a processor, may include UNIX™, Linux™, Microsoft Windows™, AIX™, IBM's z/OS™, and others known to those of ordinary skill in the art. In addition to the operating system 654 being located in RAM 668, other components of such as data processing applications may be stored in the RAM 668. Furthermore, software and other components may be stored in non-volatile memory, such as on a disk drive 6600.

The computer 652 may include a disk drive adapter 652 coupled through an expansion bus 660 and bus adapter 658 to the processor 656 and other components of the computer 652. The disk drive adapter 652 may connect non-volatile data storage to the computer 652 in the form of the disk drive 660. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 652 may include one or more input/output ("I/O") adapters 658. I/O adapters 658 may implement user-oriented input/output through, for example, software drivers and computer hardware for controlling output to display devices, such as computer display screens, as well as user input from user input devices 681, such as a keyboard and mouse. The computer 652 may include a video adapter 609, which is an example of an I/O adapter specially designed for graphic output to a display device 580, such as a display screen or computer monitor. Video adapter 609 is connected to the processor 656 through the high speed video bus 664, bus adapter 658, and the front side bus 662, which may also be a high speed bus. I/O adapters 658 may also include COMM and Drive adapters. I/O adapters 658 may also be a PCI Express in which all I/Os are connected.

The computer 652 may include a communications adapter 667 for data communications with other computers 682 and for data communications with a data communications network 600. Such data communications may be carried out serially through RS-232 connections, through external buses such as a Universal Serial Bus ("USB"), through data communications networks such as IP data communications networks, and in other ways known to those of ordinary skill in the art. Communications adapter 667 may implement the hardware level of data communications through which one computer sends data communications to another computer, directly or through the data communications network 600. Examples of the communications adapter 667 may include modems for wired dial-up communications, Ethernet (IEEE 802.3) adapters for wired data communications, and 802.11 adapters for wireless data communications.

The arrangement of computers and other devices illustrated in FIG. 6 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 5.

Computing environments of different architectures may incorporate and use one or more aspects of the address translation capability provided herein. For instance, environments based on the PowerPC architecture, also referred to as Power ISA, offered by International Business Machines Corporation and described in the Power ISA™ Version 2.06 Revision B specification, Jul. 23, 2010, incorporated herein by reference in its entirety, may include one or more aspects, as well as computing environments of other architectures, such as the z/Architecture, offered by International Business Machines Corporation, and described in z/Architecture—Principles of Operation, Publication No. SA22-7932-08, 9th Edition, August 2010, which is hereby incorporated herein by reference in its entirety.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for pre-silicon verification of asynchronous page faults, the method comprising:
   providing a simulated environment comprising: a simulated multi-slice
      processor core,
      a memory, and
      an interrupt handler configured to detect an asynchronous page fault and further configured to correct the asynchronous page fault; and
   executing a test code in the simulated environment by:
      executing a non-irritator thread code comprising a plurality of load instructions,
   wherein each of the plurality of load instructions span at least two slices of the simulated processor core;
      executing a first irritator thread code to bias against the execution of the plurality of load instructions by one of the at least two slices of the simulated processor core;

executing a second irritator thread code to invalidate caching of page table entries during execution of the plurality of load instructions in a fast access cache memory; and detecting, by the interrupt handler, an asynchronous page fault.

2. The method of claim 1, wherein the simulated processor core comprises:

a non-irritator thread configured to execute the non-irritator thread code;

a first irritator thread configured to execute the first irritator thread code; and a second irritator thread configured to execute the second irritator thread code.

3. The method of claim 1, wherein the memory comprises one or more operands that are not aligned at a doubleword boundary.

4. The method of claim 2, wherein execution of each instruction in the plurality of instructions of the non-irritator thread code causes the at least two slices to perform a disjointed storage access to retrieve the one or more operands from the memory.

5. The method of claim 1, wherein executing the first irritator thread code to bias against the execution of the plurality of load instruction by one of the at least two slices of the simulated processor core comprises:

causing that one of the at least two slices to execute a first load operation in an infinite loop.

6. The method of claim 1, wherein executing the non-irritator thread code comprises, for each of the plurality of instructions:

identifying the at least two slices;

issuing, by a first slice of the at least two slices, a page table entry (PTE) fetch request to the memory; before returning the PTE to the first slice of the at least two slices, turning OFF a valid bit of the PTE; and returning the PTE to the first slice of the at least two slices.

7. The method of claim 6, further comprising:

issuing, by a second slice of the at least two slices, the PTE fetch request to the memory; and returning the PTE to the first slice of the at least two slices, wherein the valid bit of the PTE is ON.

8. The method of claim 7, further comprising:

reporting a page fault interrupt to the page fault handler by the first one of the at least two slices;

turning ON the valid bit of the PTE by the page fault handler; and returning execution to the instruction being executed by the page fault handler.

9. The method of claim 8, further comprising wherein detecting an asynchronous page fault comprises determining that a page fault interrupt was reported by the first slice of the at least two slices and not by the second slice of the at least two slices.

10. The method of claim 8, further comprising determining that an asynchronous page fault was not detected upon occurrence of one or more of the following:

a page fault interrupt was reported by none of the at least two slices; or the page fault interrupt was reported by all of the at least two slices.

11. The method of claim 9, further comprising, by the interrupt handler, verifying one or more values in a plurality of registers configured to record information relating to page fault interrupts.

12. A computer program product for verification of an asynchronous page fault, the computer program product comprising:

a computer readable storage medium readable by a processing circuit and containing programming instructions for execution by the processing circuit for performing a method comprising executing a test code in a simulated environment by:

executing a non-irritator thread code comprising a plurality of load instructions, wherein each of the plurality of load instructions span at least two slices of a simulated multi-slice processor core in the simulated environment;

executing a first irritator thread code to bias against the execution of the plurality of load instructions by one of the at least two slices of the simulated processor core;

executing a second irritator thread code to invalidate caching of page table entries during execution of the plurality of load instructions in a fast access cache memory; and detecting, by an interrupt handler, an asynchronous page fault.

13. The computer program product of claim 12, further comprising programming instructions for execution wherein executing the first irritator thread code to bias against the execution of the plurality of load instruction by one of the at least two slices of the simulated processor core comprises:

causing that one of the at least two slices to execute a first load operation in an infinite loop.

14. The computer program product of claim 12, further comprising programming instructions for execution wherein executing the non-irritator thread code comprises, for each of the plurality of instructions:

identifying the at least two slices;

issuing, by a first slice of the at least two slices, a page table entry (PTE) fetch request to the memory;

before returning the PTE to the first slice of the at least two slices, turning OFF a valid bit of the PTE; and returning the PTE to the first slice of the at least two slices.

15. The computer program product of claim 14, further comprising programming instructions for execution wherein the method further comprises:

issuing, by a second slice of the at least two slices, the PTE fetch request to the memory; and returning the PTE to the first slice of the at least two slices, wherein the valid bit of the PTE is ON.

16. The computer program product of claim 15, further comprising programming instructions for execution wherein the method further comprises:

reporting a page fault interrupt to a page fault handler by the first one of the at least two slices;

turning ON the valid bit of the PTE by the page fault handler; and returning execution to the instruction being executed by the page fault handler.

17. The computer program product of claim 16, further comprising programming instructions for execution wherein detecting an asynchronous page fault comprises determining that a page fault interrupt was reported by the first slice of the at least two slices and not by the second slice of the at least two slices.

18. The computer program product of claim 16, further comprising programming instructions for execution wherein the method further comprises determining that an asynchronous page fault was not detected upon occurrence of one or more of the following:
- a page fault interrupt was reported by none of the at least two slices; or
- the page fault interrupt was reported by all of the at least two slices.

19. The computer program product of claim 18, further comprising programming instructions for execution wherein the method further comprises, by the page fault handler, verifying one or more values in a plurality of registers configured to record information relating to page fault interrupts.

20. The computer program product of claim 12, wherein:
- a memory of the simulated environment comprises one or more operands that are not aligned at a doubleword boundary; and
- execution of each instruction in the plurality of instructions of the non-irritator thread code causes the at least two slices to perform a disjointed storage access to retrieve the one or more operands from the memory.

* * * * *